W. TURNBULL.
SELF PROPELLED VEHICLE.
APPLICATION FILED DEC. 11, 1916.

1,329,314.

Patented Jan. 27, 1920.
3 SHEETS—SHEET 1.

WITNESSES:
Charles Reckles
J. H. Herring

INVENTOR
William Turnbull
BY Strong & Townsend,
ATTORNEYS

W. TURNBULL.
SELF PROPELLED VEHICLE.
APPLICATION FILED DEC. 11, 1916.

1,329,314.

Patented Jan. 27, 1920.
3 SHEETS—SHEET 2.

WITNESSES:

INVENTOR
William Turnbull

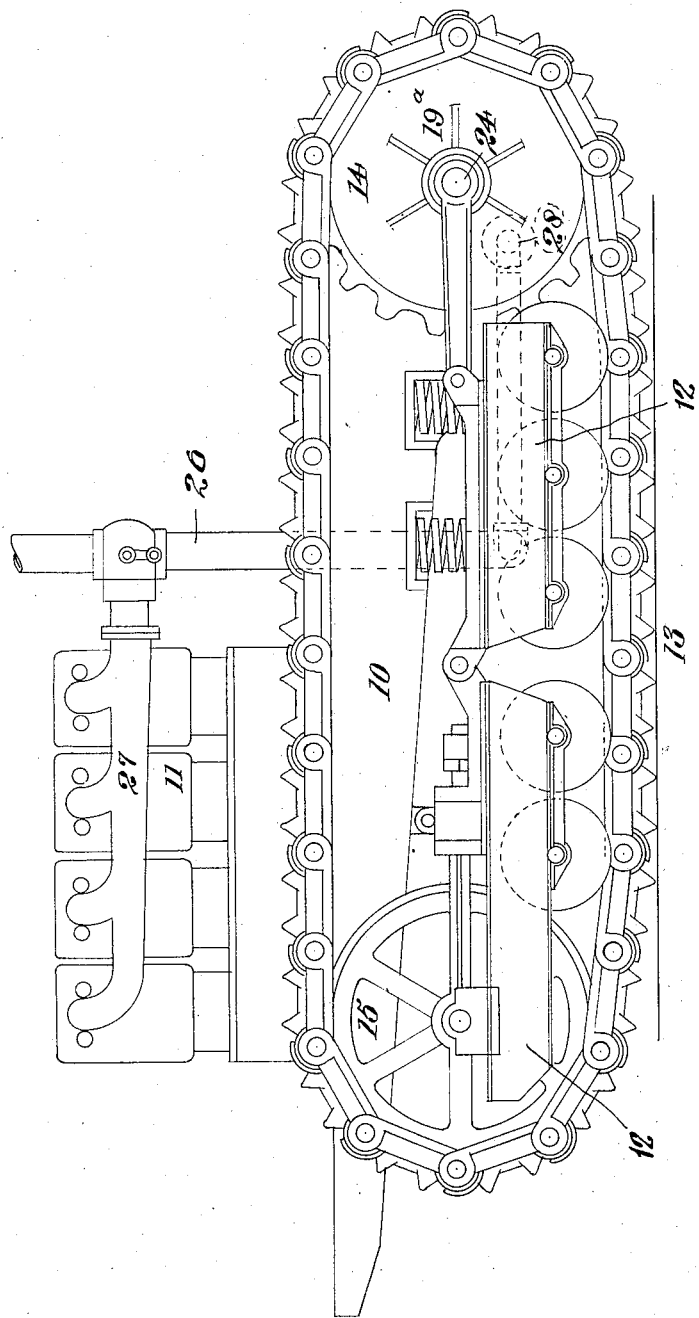

UNITED STATES PATENT OFFICE.

WILLIAM TURNBULL, OF STOCKTON, CALIFORNIA, ASSIGNOR TO THE HOLT MANUFACTURING COMPANY, OF STOCKTON, CALIFORNIA, A CORPORATION OF CALIFORNIA.

SELF-PROPELLED VEHICLE.

1,329,314.  Specification of Letters Patent.  Patented Jan. 27, 1920.

Application filed December 11, 1916. Serial No. 136,210.

*To all whom it may concern:*

Be it known that I, WILLIAM TURNBULL, a citizen of the United States, residing at Stockton, in the county of San Joaquin and State of California, have invented new and useful Improvements in Self-Propelled Vehicles, of which the following is a specification.

This invention relates to self-propelled vehicles employing internal combustion engines, and especially traction engines of the self-laying track type, and has for one of its objects to put the exhaust gases from the engine to useful purposes, principally for expelling dust and dirt from the casings of the driving gears and other parts, and also for lubrication purposes, and also for clearing the track of snow.

In its present form, I have shown the invention as embodied in a self-laying track tractor in which the driving sprocket wheel for the track is internally toothed for driving connection with a pinion on the main driving shaft. A casing is formed on the internal gear and a stationary cover is provided therefor since the shaft for the driving pinion must extend through the cover. Owing to the position of the internal gear and the necessity for a joint between the casing and cover much dust and dirt tends to enter the casing, and I provide means for utilizing the exhaust gases from the engine to expel the dust and dirt therefrom. By suitably arranged means the gases are directed from the casing onto the track beneath to keep the latter clear of loose dirt and also in a measure to lubricate the track link gudgeons which are engaged by the driving sprocket teeth.

Provision is made to prevent the exhaust gases from directly impinging upon the gearing, whereby to overcome any possibility of annealing or corrosion of the gears from the heat of the gases. Moreover, the exhaust from the engine contains much oil and carbon and in traction engines operating as they do on low-grade fuels, such as kerosene, there is more than the usual amount of oil and carbon in the exhaust, and without conducting the gases directly onto the gears I make provision for collecting a sufficient amount within the casing to benefit from their lubricating value. Other gearing than that herein shown and described may obviously be connected with the exhaust for the same purpose.

One form which my invention may assume is exemplified in the following description and illustrated in the accompanying drawings, in which—

Fig. 5 shows a side elevation of a complete tractor embodying my invention.

Figure 1:
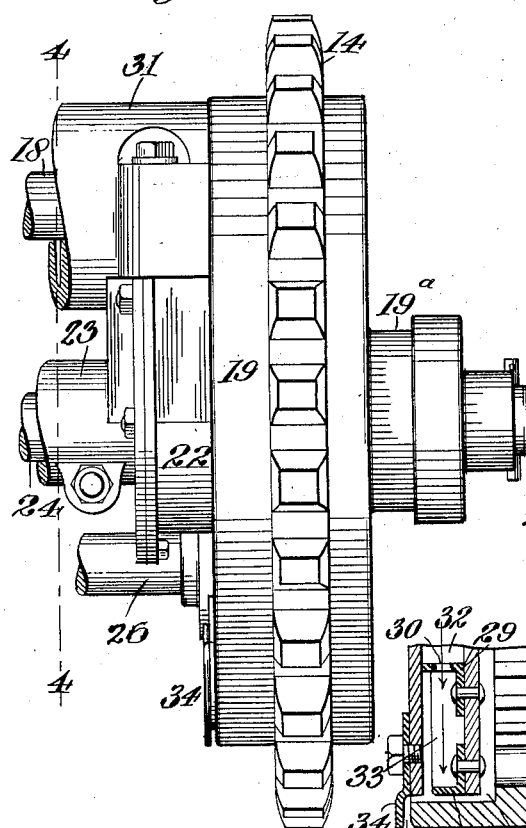
Figure 1 shows an edge view of the sprocket driving wheel and associated parts.
Figure 2:
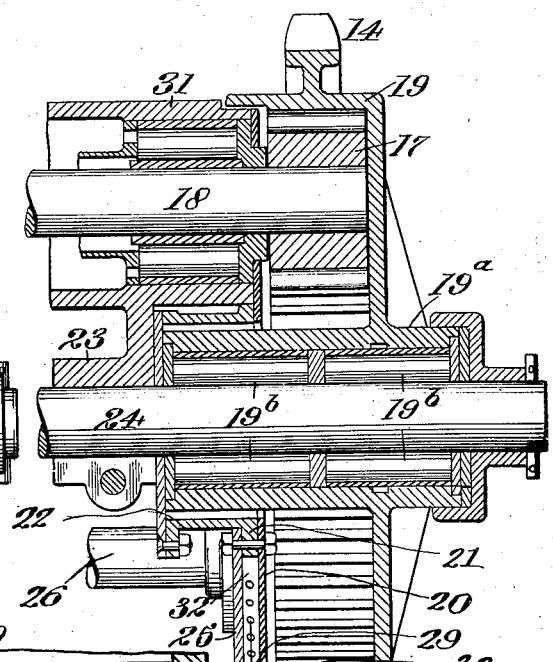
Fig. 2 shows a sectional view of the same.
Figure 3:
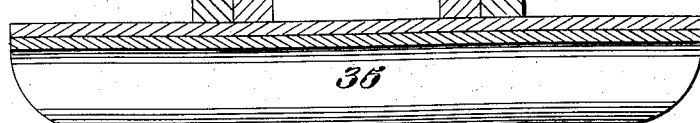
Fig. 3 shows a sectional view of the lower portion of the driving gear and track.
Figure 4:
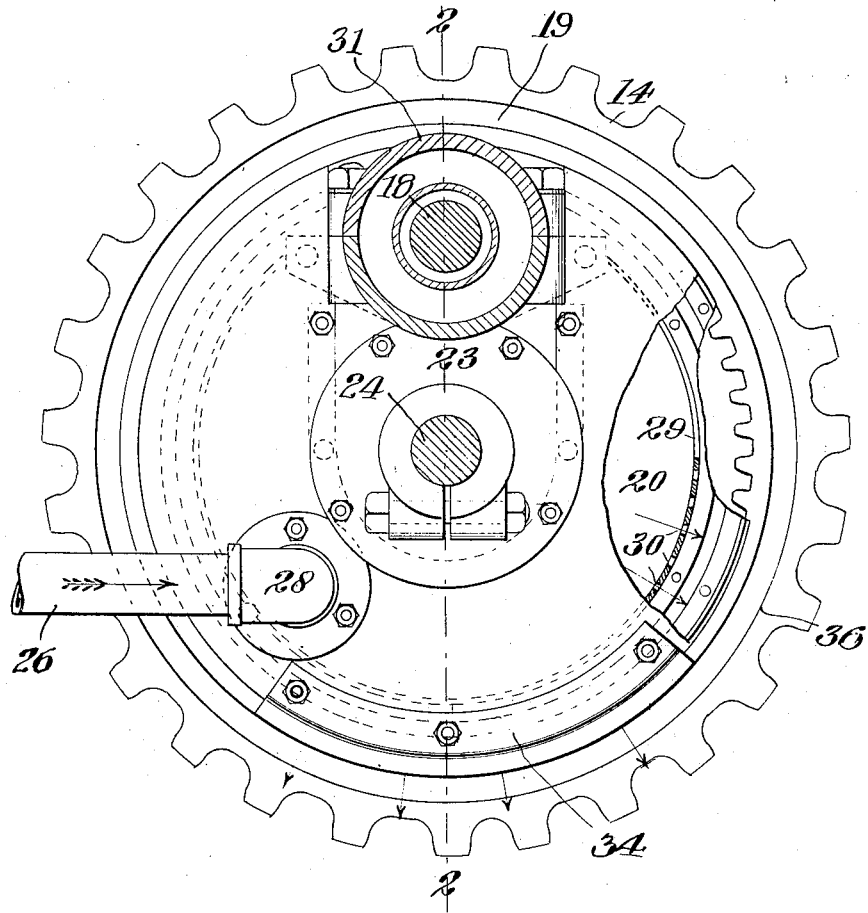
Fig. 4 shows a sectional view, taken on the line 4—4 of Fig. 1.

As shown herein, the tractor embodies a main frame 10, on which is mounted an internal combustion engine 11, and for supporting said frame is a roller truck mechanism operating upon an endless chain track 13, which latter runs over a driving sprocket wheel 14, at one end, and an idler wheel 15 at the other end. The driving sprocket wheel 14, as shown in Figs. 2 and 4, is provided with internal teeth 16 with which meshes a pinion 17 fixed upon a driving shaft 18. A casing 19 is formed upon the driving sprocket wheel and partially incloses the internal gear teeth and driving pinion.

Casing 19 is integral with the hub 19$^a$, turning freely on rollers 19$^b$, upon the shaft 24. One feature of the present invention is the special gear construction and the stationary housing plate 20, as hereinafter described.

For completely inclosing the casing I provide a chambered cover plate, held in a stationary position upon a suitable support, with its periphery slightly spaced from the rim of the casing 19 to allow rotatable movement between the parts. This casing comprises an inner plate 20, bolted to the inside of a flange 21 formed upon a stationary collar 22 surrounding the hub of the internal gear and fixed to a non-rotatable disk 23 carried on the axle 24 of the sprocket and internal gear wheel. A second cover plate 25 is bolted to the outside of the flange 21 so that it is spaced from the inside cover plate, and a pipe 26 leading from the exhaust manifold 27 of the engine 11 has a flanged elbow 28 bolted to said outside plate and communicating through an opening in the latter with the space between said cover plates. Running around the space between said plates is a partition member 29 provided with perforations 30, said partition being continuous except for an interruption where a bearing member 31 for the drive shaft 18 projects through the cover. The partition member 29 divides the space between the cover plates into an inner circular chamber 32 and an outer annular chamber 33.

The outer cover plate 25 has an arcuate deflector 34 secured to it at its lower portion and projecting over the edge of the casing 19 and spaced therefrom to direct the escaping gases downwardly upon the projecting shoes or grousers 35 of the chain track. A flange 36 is fixed upon the periphery of the inside cover plate and spaced slightly from the rim of the casing member to direct the gases outwardly as much as possible.

In operation, the exhaust gases are conducted forcibly to the inner chamber 32 and owing to the presence of the partition with perforations of restricted size the gases are caused to entirely fill the first chamber from which they will escape radially into the outer chamber 33. They are then directed by the circular flange 36 outwardly through the joint between the outside cover plate and the rim of the casing 19 with sufficient force to expel all dust and dirt collected around the edges of the casing. On the lower arc of the casing the gases are directed downwardly by the deflector 34 onto the shoe 35 to keep the same clear from loose dirt and dust, and also in a large degree serve to cleanse and lubricate the cross pieces or gudgeons 38 which engage the teeth of the sprocket 14. Where operating in cold climate the hot exhaust gases will also keep the track and sprocket teeth cleared of snow.

As will be seen, the cover plate is countersunk within the casing 19 and a ledge 37 occurs at the back thereof which, in connection with the flange 36, prevents direct passage of the gases to the interior of the casing. Some of the gases, however, will enter the gear casing but there will be no direct travel of the gases therethrough, for when a certain pressure is attained no further entrance of the gases can occur. The gas entering the interior of the gear casing will have lost considerable of its heat, by reason of the presence of the baffles and its circuitous and indirect path, and therefore the gears will not be liable to corrosion or loss of temper from this cause On the contrary, the gases upon condensing within the casing will deposit a certain amount of oil and carbon which is very desirable for lubricating the gears.

While I have referred particularly to the use of exhaust gases for excluding dirt and dust from the gearing, it is manifest that other pneumatic means may be employed for the same purpose; the underlying feature of this portion of the invention being the creation of a pressure in the gear case greater than atmospheric pressure so that the tendency of any dirt or dust to enter through the joints in or around the gear casing is counteracted by an external pressure or outward rush of gaseous fluid.

Many variations, changes and adaptations in the construction and arrangement of the several parts herein shown and described may be employed without departing from the spirit or principle of the invention.

Having thus described my invention, what I claim and desire to secure by Letters Patent is—

1. In a self-propelled vehicle, the combination of an internal combustion engine, driving gears for the vehicle, a casing for said driving gears, means for conducting the exhaust gases from the engine to the gear casing whereby to expel dust and dirt therefrom, and means for preventing the gases from directly impinging upon said gears.

2. In a tractor employing an internal combustion engine, an internal gear, a driving pinion therefor, a casing on the internal gear rotatable therewith, a stationary cover plate for the casing provided with an interior chamber, and means for conducting the exhaust gases from the engine to the chamber within the cover plate, whereby the force of the gases is applied to the joint between the casing and cover to expel the dust and dirt therefrom.

3. In a tractor employing an internal combustion engine, an internal gear, a driving pinion therefor, a casing on the internal gear rotatable therewith, a stationary cover plate for the casing provided with an interior chamber, means for conducting the exhaust gases from the engine to the chamber within the cover plate, and means for directing the gases outwardly at the joint between the cover plate and casing.

4. In a tractor employing an internal combustion engine, an internal gear, a driving pinion therefor, a casing on the internal gear rotatable therewith, a stationary cover plate for the casing provided with an interior chamber, means for conducting the exhaust gases from the engine to the chamber within the cover plate, a circular partition in said chamber provided with perforations, whereby the gases are directed radially outward throughout the extent of the chamber striking the rim of the casing, whereby to expel dust and dirt therefrom.

5. In a tractor employing an internal combustion engine, an internal gear, a driving pinion therefor, a casing on the internal gear rotatable therewith, a stationary cover plate for the casing provided with an interior chamber, means for conducting the exhaust gases from the engine to the chamber within the cover plate, a circular partition in said chamber provided with perforations, whereby the gases are directed radially outward through the extent of the chamber striking the rim of the casing, and means adjacent to the joint between the cover plate and casing for directing the gases outwardly through said joint to expel dust and dirt.

6. In a tractor of the self-laying track type and employing an internal combustion engine, a sprocket driving wheel for the track provided with internal spur teeth, a driving pinion in mesh with said internal teeth, a casing for the internal gear teeth carried on the sprocket wheel, a counter-sunk cover plate for the casing through which the shaft for the driving pinion extends, said cover plate and casing having a rotatable joint between, and means for conducting the exhaust gases from the engine to said casing to expel dust and dirt from said joint.

7. In a tractor of the self-laying track type and employing an internal combustion engine, a sprocket driving wheel for the track provided with internal spur teeth, a driving pinion in mesh with said internal teeth, a casing for the internal gear teeth carried on the sprocket wheel, a counter-sunk cover plate for the casing through which the shaft for the driving pinion extends, said cover plate and casing having a rotatable joint between, means for conducting the exhaust gases from the engine to said casing to expel dust and dirt from said joint, and means for directing a portion of the gases as they pass from said joint onto the track, whereby to keep the latter clean of loose dirt and dust.

8. In a tractor, a hollow driving sprocket having an internal gear, and means for creating an unbalanced fluid pressure on the inside and outside of the sprocket, with a greater pressure inside the sprocket and allowing the fluid under pressure in the sprocket to escape through the joints through which dust would otherwise enter to the gear.

In testimony whereof I have hereunto set my hand in the presence of two subscribing witnesses.

WILLIAM TURNBULL.

Witnesses:
J. G. SMITH,
W. P. FERGUSSON.